US006363138B1

(12) United States Patent
Aprile

(10) Patent No.: US 6,363,138 B1
(45) Date of Patent: Mar. 26, 2002

(54) E-911/ALI INFORMATION MANAGER AND MANAGEMENT SYSTEM

(75) Inventor: Michael J. Aprile, Shelby Township, MI (US)

(73) Assignee: Red Sky Technologies, Inc., Southfield, MI (US)

(*) Notice: Subject to any disclaimer, the term of this patent is extended or adjusted under 35 U.S.C. 154(b) by 0 days.

(21) Appl. No.: 09/460,048

(22) Filed: Dec. 14, 1999

Related U.S. Application Data

(60) Provisional application No. 60/118,592, filed on Feb. 4, 1999.

(51) Int. Cl.[7] .............................................. H04M 11/04
(52) U.S. Cl. .......................... 379/45; 379/49; 379/93.25
(58) Field of Search ......................... 379/45, 49, 93.25, 379/120, 121, 122, 127, 221.09, 142.15, 265, 266

(56) References Cited

U.S. PATENT DOCUMENTS 5,570,412 A * 10/1996 LeBlanc ...................... 379/58
6,104,784 A * 8/2000 Robbins ...................... 379/45
6,195,658 B1 * 2/2001 Comito et al. ................ 379/45

* cited by examiner

Primary Examiner—Curtis Kuntz
Assistant Examiner—Melur Ramakrishnaiah

(57) ABSTRACT

Disclosed is an ALI information management system which includes an ALI information manager communicatingly connected to one or more regional E-911 Service Centers and to one or more PBX's having ALI information stored therein. The ALI information manager is configured to import ALI information from the PBX's, and possibly also from one or more E-911 Service Centers, and form and/or update an ALI database using the ALI information imported. The ALI information manager is configured to send ALI information which is contained in the ALI database to the one or more regional E-911 Service Centers to continuously maintain a current master ALI database at each regional E-911 Service Center.

30 Claims, 1 Drawing Sheet

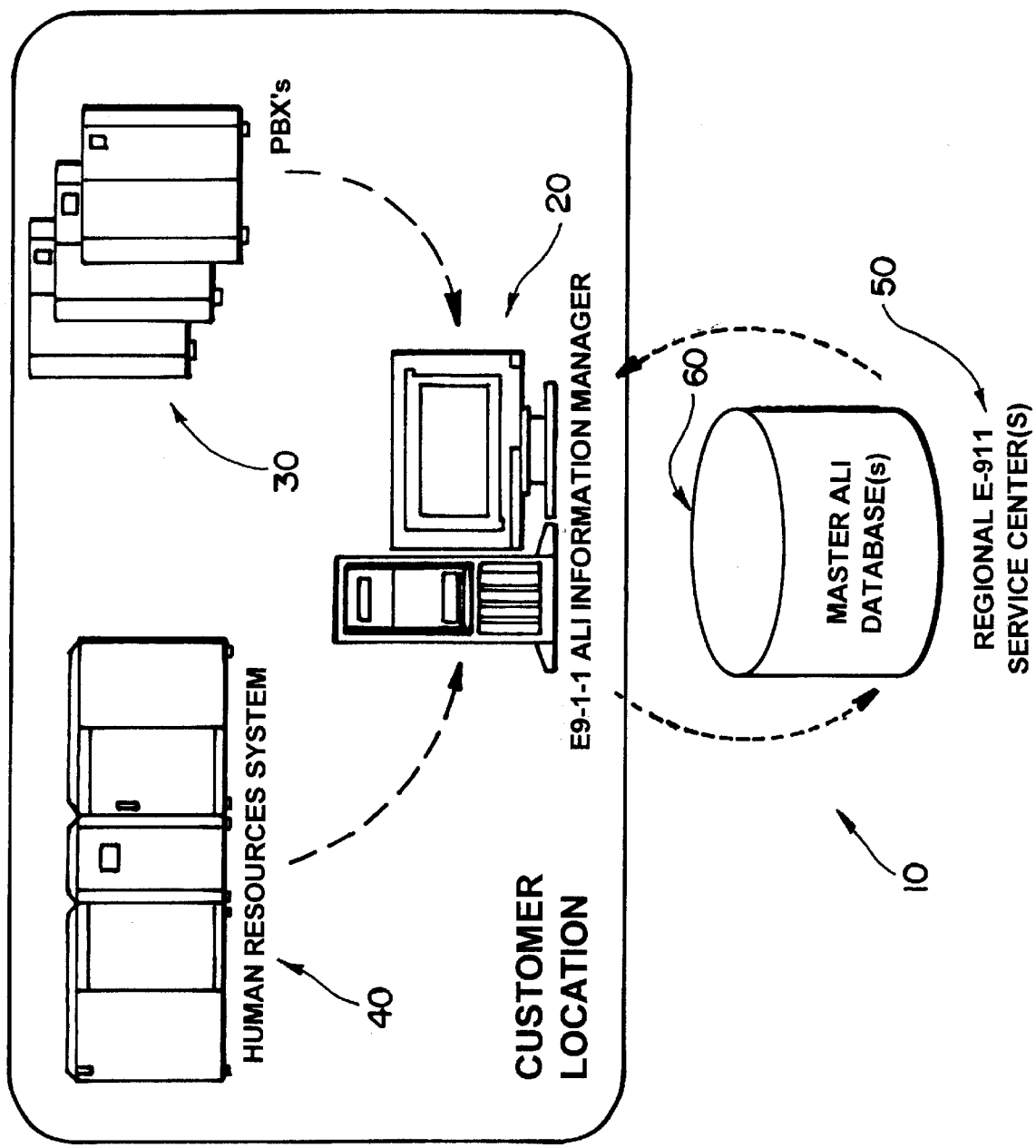

E-911/ALI INFORMATION MANAGER AND MANAGEMENT SYSTEM

This Application claims benefit of Prov. No. 60/118,592 filed Feb. 4, 1990.

BACKGROUND

When a call to 9-1-1 is placed, the call is routed to a Public Safety Answering Point (PSAP) where the call is answered. Depending on the particular nature of the call, certain security, safety and emergency resources may be dispatched in response to the call. For example, in a case where the caller is reporting the occurrence of violence, one or more police cars may be dispatched to the scene. In a case where the caller is reporting a fire, a fire truck as well as an ambulance may be dispatched.

Ideally, the caller gives the operator specific location information so that if any resources are to be dispatched, the resources are directed to the correct location. However, at times, it is important for the PSAP to be able to identify the location from which a 9-1-1 call has been placed. Such instances are when the caller hangs up before giving location information, the caller does not know the address of the location, or the caller is not able to communicate the location information for one reason or another. Additionally, if the PSAP is able to identify the location from which a 9-1-1 call has been placed, the legitimacy of the call can be verified (i.e. it can be verified that the caller is, in fact, located where the caller claims he or she is located).

In the United States, basic 9-1-1 service merely provides that 9-1-1 calls are routed to the PSAP serving the subscribing community. In contrast, enhanced 9-1-1 service identifies the telephone number which initiated the emergency call as well as provides the operator with location information relating to the telephone number. Specifically, as an enhanced 9-1-1 system takes an incoming emergency call, Automatic Number Identification (ANI) information used for establishing long distance calls is delivered to the PSAP. A database inquiry is then dispatched to an Automatic Location Identification (ALI) system which receives the ANI and provides name, address, type of service (business, residential, etc.) and any other information associated with the ANI which is stored in the system.

While location information (ALI information) may be relatively straightforward for a residence, it may not be straightforward with respect to emergency calls placed through a private branch exchange (PBX). PBX's are used to service multiple telephone stations. For example, PBX's are often used by large businesses which have multiple telephone lines. When an emergency call is placed using one of the telephone stations serviced by a PBX, typically the location information reported to the PSAP relates to the PBX, as opposed to relating to the specific telephone station which was used to place the call. As a result, unless the caller provides specific location information, resources are dispatched to the address of the PBX rather than directly to the caller, which may prove to be detrimental. For example, if a business is located throughout fifteen stories of a building, and an employee calls 9-1-1 from the thirteenth floor, and the caller does not inform the operator that he or she is calling from the thirteenth floor, resources may be dispatched generally to the building rather than directly to the thirteenth floor. Of course, this may increase the amount of time it takes for help to finally reach the caller. Even more dramatic results may be experienced where a business is dispersed in a corporate campus or across multiple buildings that are miles apart. In such a case, resources may be dispatched to the building at which the PBX is located but not to the caller who needs assistance.

To increase the accuracy of the information that is received by a PSAP when an emergency call is received, some states may require that each organization that owns a PBX must maintain detailed ALI information at a regional E-911 Service Center which the PSAP can access when an emergency call is received.

Presently, ALI information management tools are available which organizations can use to maintain an ALI database. The tools require that someone physically enter the information directly into the tool. As a result, forming an ALI database and keeping it current often proves to be a relatively major ongoing expense. It is possible that information which can be used to provide or update ALI information is already contained in the PBX equipment within the organization. However, ALI information management tools which are available provide that the same information must be physically entered directly into the ALI database in order to form the ALI database and keep it current. Additionally, ALI information management tools which are available typically require manual intervention to send information to the regional E-911 Service Centers. Still further, some ALI information management tools which are available are not very easy to use, and do not provide comprehensive reports, such as reports regarding the ALI information and its history.

Objects and Summary

It is an object of the present invention to provide an ALI information manager which is configured to interface with one or more PBX's and import ALI information therefrom on a scheduled or ad-hoc basis.

It is a further object of the present invention to provide an ALI information manager which is configured to send ALI information to one or more regional Service Centers on a scheduled and/or ad-hoc basis.

It is a further object of the present invention to provide an ALI information manager which is relatively easy to use, and which is configured to provide comprehensive reports, such as reports regarding the ALI information and its history.

It is a further object of the present invention to provide an ALI information manager which is configured to interface with external systems, such as a Human Resources System, and import ALI information therefrom on a scheduled or ad-hoc basis.

In accordance with these and other objects, the present invention provides an ALI information manager which is communicatingly connectable to one or more regional E-911 Service Centers and to one or more PBX's having ALI information stored therein. The ALI information manager is configured to import ALI information from the PBX's and form and/or update an ALI database using the ALI information imported from the PBX's. The ALI information manager is configured to send ALI information which is contained in the ALI database to the one or more regional Service Centers.

Preferably, the ALI information manager is configured to send ALI information to the one or more regional E-911 Service Centers on a scheduled and/or on an ad-hoc basis, such that a master ALI database is continuously maintained and updated at the one or more E-911 Service Centers. Additionally, it is preferred that the ALI information manager be relatively easy to use and provide relatively comprehensive reports, such as reports regarding the ALI information and its history.

BRIEF DESCRIPTION OF THE DRAWINGS

The present invention and the advantages thereof will become more apparent upon consideration of the following detailed description when taken in conjunction with the accompanying drawing of which FIG. 1 is a schematic diagram of an ALI information management system which includes an ALI information manager interfaced with PBX's and with one or more regional E-911 Service Centers.

DESCRIPTION

Illustrated in FIG. 1 is an ALI information management system 10 which includes an ALI information manager 20. Specifically, the ALI information manager 20 preferably consists of software and a computer for running the software. The software directs the computer to perform certain operations with respect to other components of the ALI information management system 10 which are interfaced with the computer in order to maintain an ALI database.

As shown in FIG. 1, preferably the ALI information manager 20 is interfaced with PBX's 30 which contain information that can be imported by the ALI information manager 20 to form and/or update an ALI database which is stored in the ALI information manager 20.

Preferably, the ALI information manager 20 is configured to import data from the PBX's 30 on an ad-hoc or scheduled basis. Further, preferably the ALI information manager 20 is configured to import data from the PBX's 30 and create an initial load of information into an ALI database, and is configured to thereafter automatically update information in the ALI database whenever data in the PBX's 30 is updated. Preferably, the ALI information manager 20 is configured to download ALI related information from the PBX's 30, is configured to automatically update the ALI database which is stored in the ALI information manager 20 when moves, adds or changes are performed with respect to the PBX's 30, and is configured to notify personnel when ALI information is missing from switch station configurations.

By providing that the ALI information manager 20 imports information from the PBX's 30 to form and/or update an ALI database, the information contained in the PBX's 30 need not be manually entered into the ALI information manager 20. In other words, the data entry is automated. As a result, it is less time consuming to form and/or update the ALI database in the ALI information manager 20. This is important because always having personnel manually enter and update ALI information, as is required in prior ALI information management systems, can prove to be a relatively major ongoing expense. Additionally, automated data entry helps to reduce or eliminate errors which might occur as the result of manual data entry.

As shown in FIG. 1, preferably the ALI information manager 20 is also configured so that it can be interfaced with one or more external systems 40 which contain ALI information, such as a human resources system. Preferably, the ALI information manager 20 is configured to import the ALI information from the system 40 on a scheduled or ad-hoc basis. Preferably, the ALI information manager 20 is configured to use the imported information to create the initial load of information into the ALI database, and automatically updates the ALI database whenever data in the system 40 is updated.

Although FIG. 1 shows the ALI information manager 20 interfaced with a single external system 40, the ALI information manager may be interfaced with a plurality of systems which contain information that can be imported by the ALI information manager 20 to form and/or update an ALI database.

As shown in FIG. 1, preferably the ALI information manager 20 is also interfaced with one or more external systems such as regional E-911 Service Centers 50. Preferably, the ALI information manager 20 is configured to periodically communicate with the E-911 Service Centers 50 to continuously maintain a respective current master ALI database 60 at each E-911 Service Center 50.

Specifically, preferably the ALI information manager 20 keeps an ALI transaction file corresponding to each E-911 Service Center, and is configured to send the respective ALI transaction file to the corresponding E-911 Service Center 50 on a scheduled or ad-hoc basis. Preferably, the ALI information manager 20 is configured to verify that ALI updates sent to the E-911 Service Centers 50 were received and correctly applied to the respective master ALI database 60 at the E-911 Service Centers 50, and is configured to maintain a log of all ALI transactions sent to the E-911 Service Centers 50.

Preferably, the ALI information manager 20 is configured to provide comprehensive, secure and reliable management of ALI information and provides a relatively easy-to-use, graphical maintenance of the ALI information.

Preferably, the ALI information manager 20 is configured to generate several different reports. Specifically, preferably the ALI information manager 20 is configured to generate an ALI information station history report, E-911 Service Center transaction history reports, an ALI information report, a switch exception report, an exception report relating to the system interfaced with the ALI information manager and a failed transaction report. The ALI information modification history report provides an audit trail of changes to the ALI database(s) 60, while the E-911 Service Center transaction history reports provide audit trails of all transactions between the ALI information manager 20 and the Service Centers 50.

Although not specifically illustrated in FIG. 1, the ALI information manager 20 may or may not be configured to allow individual employees to view and maintain their own ALI information over an intranet, extranet or the Internet via one or more web-based interfaces. In such a case, preferably the ALI information manager 20 is configured to provide user logins with multiple security levels to prevent unauthorized modifications to ALI information.

Generally, the ALI information manager 20 may be configured to integrate completely into one or more pre-existing telecommunications information management systems, may be configured to operate with any suitable operating system, such as Windows® 95, Windows® 98 or Windows NT® 4.0, and may be configured to support several different PBX models produced by different companies.

By interfacing to PBX equipment 30, etc. in an organization that maintain the necessary information, and possibly also with one or more external systems 40, the ALI information manager 20 can provide very comprehensive and automated management of an organization's ALI information. Additionally, when moves, adds or changes are performed with respect to PBX's 30, and possibly when information is updated in one or more systems 40 to which the ALI information manager 20 is interfaced, the ALI information manager 20 ensures that this information is sent to the one or more corresponding E-911 Service Centers 50. In fact, as discussed above, the ALI information manager 20 preferably even automatically verifies that the changes to the ALI information were successfully validated by the E-911 Service Center 50 and applied to the E-911 ALI database. By providing that the ALI information manager 20 imports information from the PBX's 30, and possibly also from one or more external systems 40, to form and/or update an ALI database, it is less time consuming to form and/or update the ALI database. This is important because always having personnel manually enter and update ALI information can prove to be a relatively major ongoing expense.

While embodiments of the present invention are shown and described, it is envisioned that those skilled in the art may devise various modifications of the present invention without departing from the spirit and scope of the present invention.

What is claimed is:

1. An ALI information manager which is communicatingly connectable to at least one external system and to at least one PBX having ALI information stored therein, said ALI information manager configured to import ALI information from the at least one PBX and at least one of form and update an ALI database using the ALI information imported from the at least one PBX, said ALI information manager being configured to send ALI information which is contained in the ALI database to the at least one external system.

2. An ALI information manager as recited in claim 1, configured to send ALI information to the at least one external system on at least one of a scheduled and ad-hoc basis.

3. An ALI information manager as recited in claim 2, configured to generally continuously maintain a master ALI database at the at least one external system.

4. An ALI information manager as recited in claim 1, configured to generate at least one report regarding the ALI information and history relating thereto.

5. An ALI information manager as recited in claim 1, configured to import data from the at least one PBX and create an initial load of information into the ALI database, and configured to thereafter automatically update information in the ALI database whenever data in the at least one PBX is updated.

6. An ALI information manager as recited in claim 1, configured to download ALI related information from the at least one PBX, and configured to automatically update the ALI database which is stored in the ALI information manager when at least one of a move, add or change of a station is performed with respect to the at least one PBX.

7. An ALI information manager as recited in claim 1, configured to provide a notification when ALI information is missing.

8. An ALI information manager as recited in claim 1, configured to be interfaced with at least one external system containing ALI information.

9. An ALI information manager as recited in claim 8, wherein the at least one external system containing ALI information comprises a human resources system.

10. An ALI information manager as recited in claim 8, configured to import the ALI information from the at least one external system containing ALI information on at least one of a scheduled and ad-hoc basis.

11. An ALI information manager as recited in claim 10, configured to use the imported information to create an initial load of information into the ALI database, and configured to automatically update the ALI database whenever data in the at least one external system containing ALI information is updated.

12. An ALI information manager as recited in claim 8, configured to maintain an ALI transaction file corresponding to each external system to which said ALI information manager sends ALI information, and is configured to send the respective ALI transaction file to the corresponding external system on at least one of a scheduled and ad-hoc basis.

13. An ALI information manager as recited in claim 12, configured to verify that ALI updates sent to the external systems were received and correctly applied to the respective master ALI database at the external systems, and configured to maintain a log of all ALI transactions sent to external systems.

14. An ALI information manager as recited in claim 1, comprising a computer which is communicatingly connectable to the at least one external system and to the at least one PBX having ALI information stored therein, and comprising software stored in said computer, said software configured to import ALI information from the at least one PBX and at least one of form and update the ALI database using the ALI information imported from the at least one PBX, wherein said computer is configured to send ALI information which is contained in the ALI database to the at least one external system.

15. An ALI information manager as recited in claim 1, said at least one external system comprising at least one regional E-911 Service Center.

16. An ALI information management system comprising: an ALI information manager; at least one external system, said ALI information manager communicatingly connected to the at least one external system; at least one PBX having ALI information stored therein, said ALI information manager configured to import ALI information from the at least one PBX and at least one of form and update an ALI database using the ALI information imported from the at least one PBX, said ALI information manager being configured to send ALI information which is contained in the ALI database to the at least one external system.

17. An ALI information management system as recited in claim 16, wherein said ALI information manager is configured to send ALI information to the at least one external system on at least one of a scheduled and ad-hoc basis.

18. An ALI information management system as recited in claim 17, wherein said ALI information manager is configured to generally continuously maintain a master ALI database at the at least one external system.

19. An ALI information management system as recited in claim 16, wherein said ALI information manager is configured to generate at least one report regarding the ALI information and history relating thereto.

20. An ALI information management system as recited in claim 16, wherein said ALI information manager is configured to import data from the at least one PBX and create an initial load of information into the ALI database, and is configured to thereafter automatically update information in the ALI database whenever data in the at least one PBX is updated.

21. An ALI information management system as recited in claim 16, wherein said ALI information manager is configured to download ALI related information from the at least one PBX, and is configured to automatically update the ALI database which is stored in the ALI information manager when at least one of a move, add or change of a station is performed with respect to the at least one PBX.

22. An ALI information management system as recited in claim 16, wherein said ALI information manager is configured to provide a notification when ALI information is missing from the at least one PBX.

23. An ALI information management system as recited in claim 16, wherein said ALI information manager is interfaced with at least one external system containing ALI information.

24. An ALI information management system as recited in claim 23, wherein the at least one external system containing ALI information comprises a human resources system.

25. An ALI information management system as recited in claim 23, wherein said ALI information manager is configured to import the ALI information from the at least one external system containing ALI information on at least one of a scheduled and ad-hoc basis.

26. An ALI information management system as recited in claim 25, wherein said ALI information manager is configured to use the imported information to create an initial load of information into the ALI database, and is configured to automatically update the ALI database whenever data in the at least one external system containing ALI information is updated.

27. An ALI information management system as recited in claim 23, wherein said ALI information manager is configured to maintain an ALI transaction file corresponding to each external system to which said ALI information manager sends ALI information, and is configured to send the respective ALI transaction file to the corresponding external system on at least one of a scheduled and ad-hoc basis.

28. An ALI information management system as recited in claim 26, wherein said ALI information manager is configured to verify that ALI updates sent to the external systems were received and correctly applied to the respective master ALI database at the external systems, and is configured to maintain a log of all ALI transactions sent to external systems.

29. An ALI information management system as recited in claim 16, wherein said ALI information manager comprises a computer which is communicatingly connectable to the at least one external system and to the at least one PBX having ALI information stored therein, and comprising software stored in said computer, said software configured to import ALI information from the at least one PBX and at least one of form and update the ALI database using the ALI information imported from the at least one PBX, wherein said computer sends ALI information which is contained in the ALI database to the at least one external system.

30. An ALI information management system as recited in claim 16, said at least one external system comprising at least one regional E-911 Service Center.

* * * * *